Dec. 15, 1942.   H. G. KAMRATH   2,304,829
AIR CLEANER
Filed Aug. 18, 1934   2 Sheets-Sheet 2
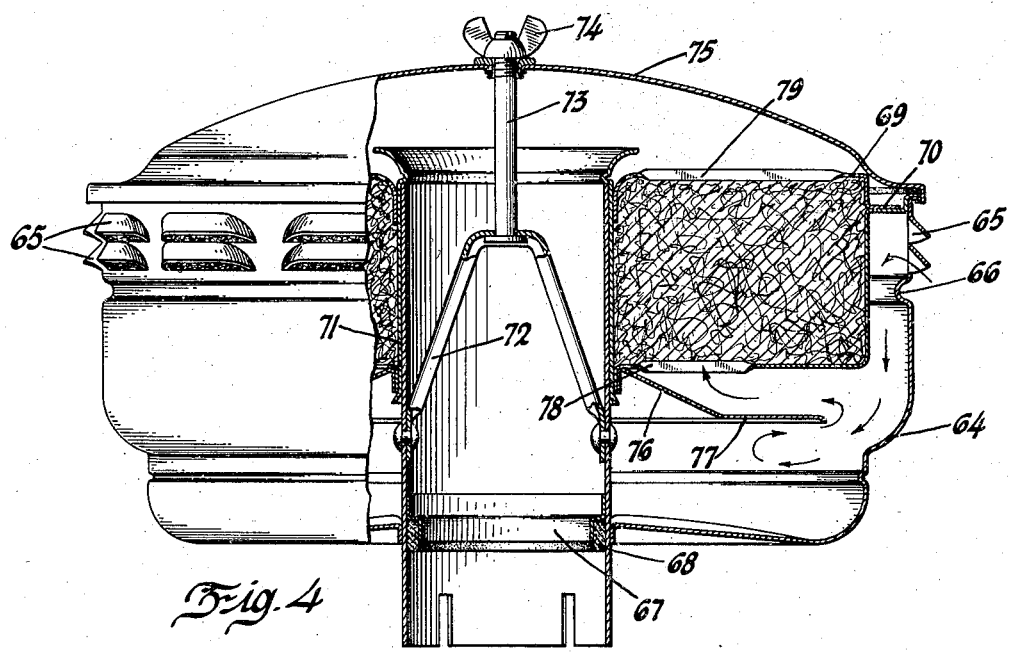
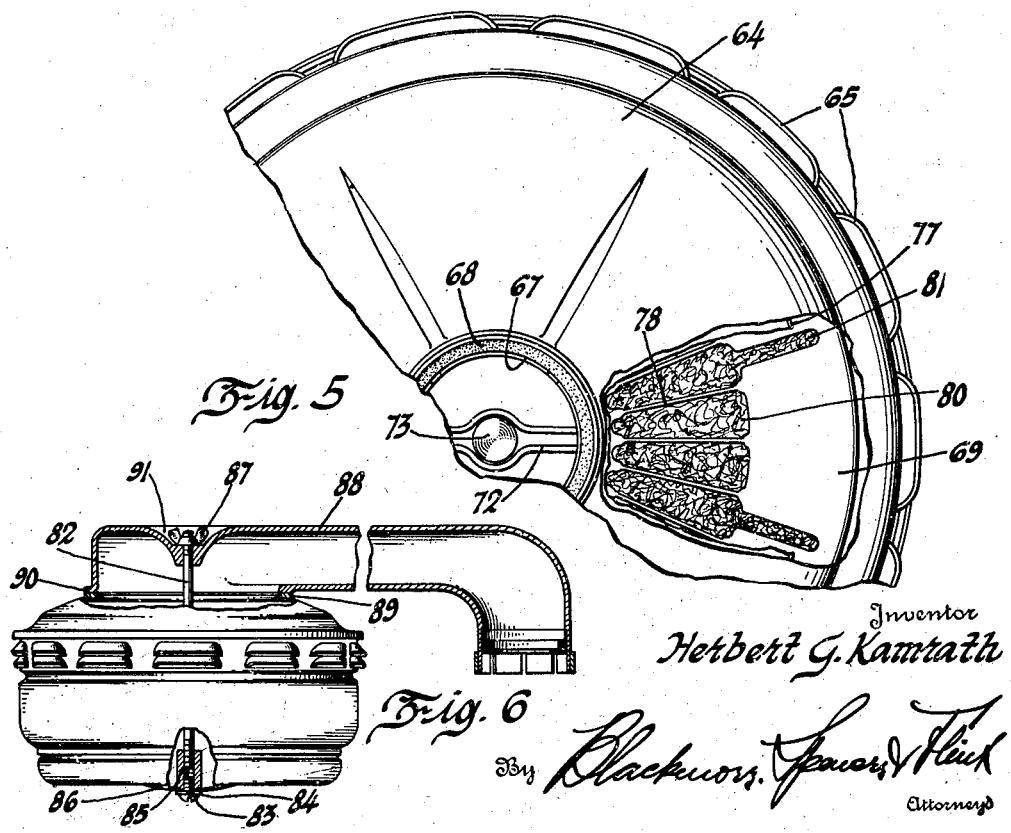

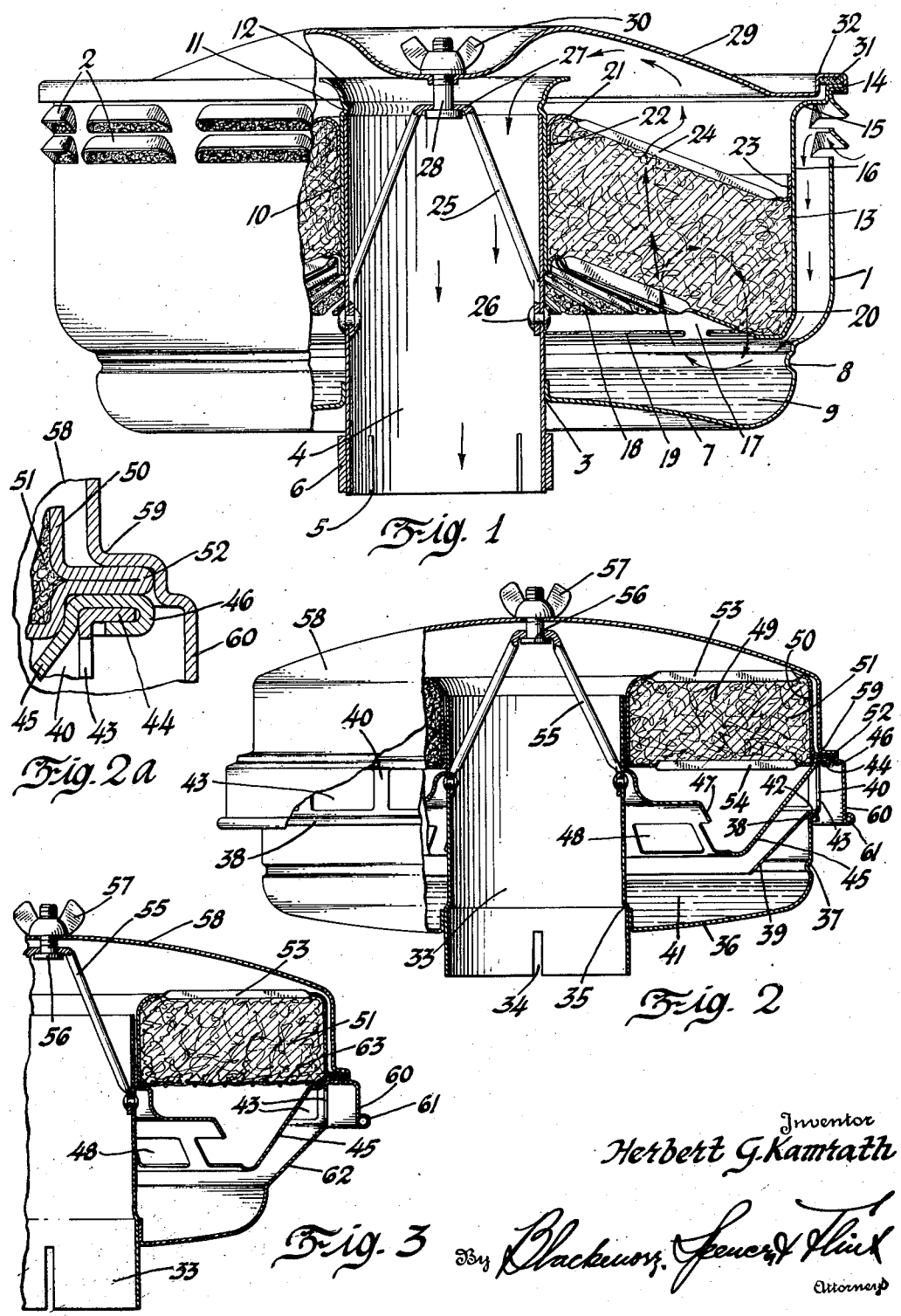

Patented Dec. 15, 1942

2,304,829

UNITED STATES PATENT OFFICE 2,304,829

AIR CLEANER

Herbert G. Kamrath, Flint, Mich., assignor to General Motors Corporation, Flint, Mich., a corporation of Delaware Application August 18, 1934, Serial No. 740,420
Renewed February 21, 1940

24 Claims. (Cl. 183—15)

This invention relates to apparatus for removing foreign matter from gases and particularly to air cleaners for use in conjunction with the carburetors of internal combustion engines.

The invention resides in an air cleaner which is particularly adapted for use in localities in which there is in the air a large amount of foreign matter which must be removed before the air is fit for introduction into an internal combustion engine. Such air cleaners must, without offering undue resistance to the passage of air, be capable of removing large quantities of dust from it over extended periods of time without any attention or care. The principal object of this invention is to provide an air cleaner with the mentioned characteristics and capabilities.

For a better understanding of the nature and objects of this invention, reference is made to the following specification wherein there are described the embodiments of my invention which are illustrated in the accompanying drawings.

In the accompanying drawings:

Figure 1 is a view, partly in section and partly in elevation, of an air cleaner in which my invention is embodied.

Figure 2 is a view similar to Figure 1 of another air cleaner in which my invention is embodied.

Figure 2a is an enlarged fragmentary view of a detail of the air cleaner shown in Figure 2.

Figure 3 is a fragmentary vertical section through a third air cleaner in which my invention is embodied.

Figure 4 is a side elevation partly in section of a fourth air cleaner in which my invention is embodied.

Figure 5 is a bottom plan view of the air cleaner shown in Figure 4 with a part of the bottom broken away.

Figure 6 is a view partly in elevation and partly in section showing how the air cleaners shown in the preceding figures may be modified to adapt them for use in installations where there is very little head room.

The air cleaner shown in Figure 1 includes an outside casing 1 which is in the form of a large cup shaped member open at the top. Just below the top louvres 2 are provided in the casing. An opening 3 is provided in the horizontal center of the bottom of the casing and through this opening projects a tube 4 secured therein by spot welding. The tube 4 is slotted at its lower end as shown at 5, and a ring 6 placed around the outside, both of these last mentioned means being used for connecting the air cleaner to the intake tube of a carburetor.

The bottom of the casing 1 is dished upwardly, as shown at 7, and in the lower portion of the vertical side is formed an inwardly extending bead 8. This lower portion is filled with oil 9 up to the level of the lower edge of the bead 8.

A sleeve 10, which fits upon the upper end of the tube 4 has an indenture 11 extending around its circumference which prevents it from sliding down too far on the tube 4. From the indenture to the top of the member it is flared outwardly as at 12. Rigidly secured to the lower extremity of the sleeve 10, throughout its circumference, is the filtering material container 13 which is substantially the same shape as the outer casing 1, but spaced therefrom at all points, the upper outer rim 14 being supported upon the rim of the casing 1. Below the rim 14 the container is offset first, downwardly in contact with the inside of the casing to form a tight joint, and then inwardly, as at 15, a substantial distance, then straight down as at 16 to about the top of the bead 8 and then inwardly and upwardly as at 17 to the sleeve 10. The bottom portion 17 of the container has therein a series of radial openings 18 extending from adjacent the inner edge toward its outer edge throughout its circumference and also a series of circumferential slots 19 located adjacent its outer edge. The purpose of these openings will be more clearly pointed out at a later point.

Carried by the container is the filtering element 20 which may be copper mesh. Above the copper mesh is a conical plate 21 which has a flange on each edge, as shown at 22 and 23. The flange 22 is secured to the sleeve 10 near the top and the flange 23 abuts and is secured to the inside of the container wall 16. The plane of the plate is substantially parallel to that of the base 17 of the container. The plate also has a series of radial openings 24 therein which extend practically from one edge to the other. This plate covers the copper mesh and completes the container assembly therefor.

Inside of the tube 4 is located an inverted U-shaped rod 25 which is secured to the walls of the tube by rivets 26. The upper end of the U is flattened out as at 27 and a bolt 28 is secured thereto. A cover member 29, dished upward from the outside flange that forms the rim and then having a depressed central portion, fits over the bolt 28 and is secured to the casing by a wing nut 30. The flanged edge 32 of the cover contains a gasket 31 which contacts the rim 14 of the container 13 and the lip of the flange extends down over both the rim of the container and the rim of the casing.

The air cleaner shown in Figure 1 is intended for use with a down-draft carburetor. To install it on such a carburetor, the lower end of the tube 4 is fitted around the carburetor air intake tube. As shown by the solid arrows, air enters the cleaner through the louvers 2, passes downwardly between the outer casing and the container wall and then through the restriction between the bead 8 and the outside corner of the container 13. The restriction increases the velocity of the air and since it is traveling downwardly, it impinges upon the oil with sufficient velocity to dash the heavier dust particles into the oil and also to pick up a certain amount of oil. This mixture of oil and air is carried up through the radial openings 18. The cross sectional area of the filter is, of course, larger than that of the openings in the base of the container so the air will expand as it moves upwardly in the filter and its velocity will decrease. This allows the oil to separate from the air and flow down the conical filter base toward the oil discharge slots 19 which are located adjacent the restricted air entrance, above mentioned, the path of the oil being shown by the dotted arrows. The oil carried up into the filter member will thus keep the filter material coated with oil and the dust in the air that is progressing through the filter will adhere to the oil coated surfaces. This dirt collected in the filter material is picked up by the excess oil and returns to the oil sump with it.

The Venturi effect at the restricted portion assists in drawing the dirty oil out of the filter element through circumferential openings 19. The oil being discharged at this point also creates a curtain of oil through which the incoming air must pass which increases the efficiency of the cleaner.

After being freed of oil and dirt in the filter element the cleaned air then passes upwardly through the radial openings 24 in the top conical plate 21 and up to the space just below the cover. There it again reverses and goes down through the central tube 4 to the carburetor. The flared upper end 12 of the center tube of the filter member tends to effect spreading out of the current of air flowing through the filter member and thus to eliminate localized high velocity zones in it and to prevent the current of air carrying over into the center tube 4 oil picked up by it from the supply in the bottom of the air cleaner. The dust collected by the oil settles in the oil base when the motor is idle and does not recirculate thereafter.

The disassembly of the device is very simple and is accomplished by first removing the wing nut 30 and taking off the cover 29. Then the filter assembly may be removed bodily by pulling the sleeve 10 from the tube 4. Last, the outside casing may be disengaged from the carburetor. The filter material and casing may then be cleaned. It is, of course, understood that in initial installation the filter material is saturated with clean oil so that its surfaces are coated before the filter is assembled and so after the filter element has been cleaned it should be again dipped or saturated with clean oil before reassembly. The parts may then be reassembled.

In the air cleaner shown in Figure 2, there is a tube 33 which is slotted, as at 34, to enable it to be secured to the air intake tube of a carburetor. The lower portion of the tube is offset to form a shoulder 35 to prevent the air intake tube from sliding too far within the tube 33. Secured to the outside of the larger portion of the tube 4 is a cup-shaped oil sump 36 which has an oil level indicating bead 37 in its side. The top rim of this cup-shaped member is flanged, as at 38, and extends only up to about one-half the height of the tube 33. Resting upon the flange 38 is an inverted frusto-conical member 39 which has made integral therewith a cylindrical base 40. The lower edge of the inverted frusto-cone reaches almost to the surface of the oil 41 in the sump. The upper edge of the cone is slightly offset, as at 42, to give a seating portion therefor on the flange 38. The cylindrical portion has a series of rectangular openings 43 throughout its circumference which are used as means for taking in air. The upper extremity of the cylindrical portion 40 is flanged outwardly as at 44.

A second inverted frusto-conical member 45 is secured to the top flange 44 of the member 39 by having its rim portion doubled around the flange, as at 46 best shown in Fig. 2a. The lower edge of the inverted frusto-cone 45 is bent upwardly to form an upright generally frusto-conical section 47 with an inwardly directed step in it. The upper edge of this last mentioned section makes frictional contact with the tube 33. Circumferentially spaced about the base of this last mentioned conical section are rectangular openings 48 for the passage of air.

Above this V-shaped section is mounted an annular filter assembly 49. The casing is formed of a single sheet of metal which is bent to form a hollow annular enclosure 50 for the filter material 51. At the lower outer edge the sheet is bent outwardly from the general contour of the cylindrical side and then back upon itself to form a lip portion 52 which rests upon the flange 44 through the intermediary of the rim 46 of the member 45. In the lower and upper surfaces of the annular member are formed radial openings 53 and 54. This annular member is supported at the inside periphery by the tube 33 and at the outside periphery by the lip 52 which rests on the flange 44 through the intermediary of the rim 46 of the member 45 and is held in place by an offset portion of the cover as will be more clearly set forth.

Inside the tube 33, as in the cleaner shown in Figure 1, is supported an inverted U-shaped rod 55 which is secured to the cylinder by rivets and which supports at its upper flattened end a bolt 56 to which the cover member is secured by wing nut 57. The cover 58 is a large bell-shaped member which comes down over and covers a large part of the whole cleaner. The top portion is domed and is slightly larger than the annular filter assembly, and the cover then extends downwardly to the lip 52, which is supported on flange 44 through the intermediary of the rim 46 of the member 45. A horizontal portion 59 which rests upon the lip 52 is then formed on the cover and to this horizontal portion is added a vertical portion which skirts the end of the lip and encloses the same. Below this is a further small offset and then the cover extends down, as at 60, until it covers the openings 43. The end of the cover is rolled, as at 61, to form a reinforcing bead.

The air cleaner shown in Figure 2 is designed to be installed on a carburetor in the same manner as that shown in Figure 1 and its operation may be described as follows: Air enters under the lower part of the bell-shaped cover, then flows through holes 43 into the channel formed between the two downwardly directed surfaces 45 and 39 which direct it toward and increase the velocity at which it strikes the surface of the oil in the sump. The air is then deflected upwardly by the oil surface, leaving in the oil the heavier dirt particles and picking up drops of oil, then passes through the openings 48 and then 54 to contact the filter material 51 where the oil and the remaining dirt particles are removed, then out through the openings 53 to the outlet 33. The oil carried up into the filter member as in the previous case will keep the filter material coated with oil and the dirt which is still in the air passing therethrough will adhere to the oil soaked material. The excess oil will flow back to the sump by running down the slanting sides of the frusto-conical member 45 to the bottom of the V and then running out of the openings 48. The section 47 of the member 39 serves to limit the amount of oil carried by the air into the filter assembly 49 and thus to obviate "pull-over" of oil from the air cleaner into the carburetor and engine.

The disassembly of this form is very similar to the one previously described. The wing nut 57 is first removed which allows the cover 58 to be removed. The filter means may then be lifted from the end of the tube 33 and cleaned. If it is desired to clean the sump also the assembly 39—40—45—47 may be removed from the body 33—36 of the cleaner and the latter disengaged from the carburetor intake and cleaned.

The modification shown in Figure 3 is similar to that shown in Figure 2 but differs from it in several respects. First, the inverted frusto-conical member 39 of Figure 2 has been eliminated and the shell of the oil container or sump modified to provide a cylindrical section in which the air intake openings 43 are formed and a frusto-conical section 62 which has approximately the same relation to the member 45 as the member 39. Second, the bottom panel of the annular filter assembly has been removed and a wire mesh 63 inserted in its place. Third, the filter assembly and the member 45 have been permanently secured together at their outer edges and the member 45 modified at its inner edge to provide a seat for the filter assembly. This gives a construction which is simpler and embodies less parts. The operation is substantially the same as and the mode of disassembly is similar to that of the air cleaner shown in Figure 2 except in that the member 45 does not have to be removed from the body separately from the filter assembly and there are, consequently, less parts to be handled.

In the modification shown in Figure 4, a baffle member is used over the oil. The outside casing member 64 is substantially the same as that shown in Figure 1 with air louvres 65 near the top and an annular bead 66 just below them. Within the central tubular member is secured an angle ring 67 which supports a gasket means 68 to fit against the carburetor air intake tube. The annular filter element 69 is of substantially square cross section and has an angled lip portion 70 secured near the top of the outside surface which engages the rim of the casing and is supported thereby. The inner edges of the upper and lower walls of the annular member are secured to the sleeve 71 which slides down upon and is supported by the central tube through the annular bead near its upper end. An inverted U-shaped member 72 made of a small angle iron is riveted to the inside of the central tube and supports a bolt 73 to which the wing nut 74 is threaded to secure in place over the device the cover 75 whose outer edge is seated on the lip 70 of the filter element.

Rigidly secured to the flange on the lower wall of the annular filter member which is in turn secured to the sleeve 71 is a conical plate 76, the rim of which is flattened out, as at 77, to be parallel to the lower surface of the annular member. This member acts as a baffle to the air stream, and prevents too much oil being carried by the air to the filter from the sump. In the upper and lower surfaces of the annular filter member are a series of openings 78 and 79, which are of varying lengths, as better shown in the detail in Figure 5. As shown, there are two short openings 80, then one long opening 81. The long slots 81 are extended nearly to the outer edge to provide a return passage for the excess oil carried into the filter means by the air stream. The air and oil enter the filtering means through the short openings 80 and the inner ends of the openings 81. Then the oil flows to the outer periphery and may then return through the smaller outer ends of the slots 81. Any other order, however, may be used. Short circumferential slots may be connected to the ends of the longer slots 81 to give a series of annular slots at the edge to assist in giving sufficient openings for the draining of the excess oil. The path of the air through this modification is also shown by arrows. As stated above, the purpose of the baffle is to prevent too much oil from being carried from the sump into the filter material. This is, however, only necessary in installation where the air flow is high and if the cleaner is to be used only on moderate or light air flow installations the baffle may be dispensed with. The mode of disassembly of the air cleaner shown in Figures 4 and 5 is similar to that of the air cleaner shown in Figure 1.

In some installations, there is insufficient head room above the carburetor in which to place an air cleaner, therefore it is desirable to place it to one side of the carburetor. So that it may be used in such an installation, any of the cleaners illustrated in Figures 1 to 5 may be modified as suggested in Figure 6, i. e., by (a) eliminating its stirrups 25, 55 or 72 and the projecting lower end of its central tube; (b) providing a central opening in its cover 29, 58 or 75; and (c) applying a closure 86 to the lower end of its central tube, applying one end of a U-shaped fitting 88 (whose opposite end is adapted to be connected to the air intake tube of a carburetor) to the opening in the cover and connecting the closure and the fitting to the body of the cleaner by a stud 82 and a wing nut 87. The lower closure member 86 is secured to the stud 82 by a threaded sleeve 85 secured to the lower end of the stud and a cap screw 83 and washer 84 threaded into the opposite end of the sleeve which latter actually contacts and supports the closure member. When the wing nut 87 is unscrewed the outlet fitting 88 and the closure member 86 are freed from the body and cover of the air cleaner and the latter may be disassembled in the manner hereinbefore indicated.

It will therefore be seen that I have provided an efficient, economical device which may easily be disassembled and cleaned for cleaning air used in internal combustion engines.

I claim:

1. An air cleaner comprising a drum shaped casing having a cover fitting over the top portion, air louvres in the side wall and a pool of oil in the base, a cylindrical tube extending up through the base and attached thereto, an annular filter element supported by the central tube and the casing, radial openings of different sizes in the top and bottom surfaces of the annular member, and filtering means within the annular member, the casing and the filter element constituting a means for directing the air downwardly to a space below the filter element upon entry whereby it contacts the oil and carries particles thereof up into the filter element to cleanse the air.

2. An air cleaner comprising a drum shaped casing having a cover fitting over the top portion thereof, a cylindrical tube supported in the center of the casing and projecting through the bottom face thereof, an annular filter element supported on the central cylinder and the casing, radial openings of various sizes in the top and bottom surfaces of the annular element, filtering means within the filter element, and openings in the outer surface of the casing, the casing and the filter element constituting means for directing the air down below the filter element whereby air taken in through the openings will go below the element, then up through the filtering means and then down through the central tube and out.

3. An air cleaner comprising a casing in the shape of a short cylinder having openings in the face and an oil bath in the base, a smaller cylinder fitting inside the casing and projecting through the base section of the casing, filtering means supported between the casing and the cylinder by a rigid hollow annular member which is supported at its inner edge by the cylinder and at its outer edge by the casing, an air passage between the outside of the annular member and the casing through which the incoming air travels downwardly toward the oil bath, the lower and upper surfaces of the annular member being formed of spaced plates with a plurality of radial openings therein, a cover secured over the top of the whole, but having a space between the top of the central cylinder and itself whereby air may be drawn through the openings in the casing down to the oil pool then up through the filtering means and lastly down through the central cylinder and out.

4. An air cleaner comprising a drum shaped casing having a cover fitting over the top portion, air louvres in the side wall and a pool of oil in the base, a cylindrical tube extending up through the base, an annular filter element supported by the central tube and the casing, radial openings of different sizes in the top and bottom surfaces of the annular element, and a baffle plate extending over the oil below the annular element, the casing and the filter element constituting means for directing the air downwardly to the oil pool upon entry whereby it contacts the oil and then changes its direction to flow around the end of the baffle to get to the filter element.

5. An air cleaner assembly comprising a drum-shaped casing having a cylindrical tube projecting through the base and supported within it, a cover for the casing, a central hole in the cover, a U-shaped connecting conduit fitting the hole in and mounted on the top of the cover, a plate closing the opening in the bottom of the central tube, and a wing nut and a rod extending through the central tube, the plate and the conduit to secure the assembly together.

6. In an air cleaner, a drum-shaped casing having an oil bath in the base, a circumferential bead on the casing projecting inwardly to locate the oil level, air louvers in the outer vertical face of the casing, an annular filter element supported within the casing, its outer periphery spaced from the casing to provide an air passage from the louvers, said periphery approaching the bead to provide a restricted area to increase the air velocity therethrough as it impinges on the oil bath.

7. In an air cleaner, two telescoping members spaced apart to provide an annular air passage, an inwardly projecting bead in the outer member which approaches the periphery of the inner member to cause a restriction in the air passage, said outer member having an oil pool in the base, filter material carried by the inner member to remove the dirt and oil from the incoming air, said inner member having a plurality of openings adjacent the restricted air area whereby the Venturi effect of the air flow sucks excess oil from the filter.

8. In an air cleaner, a casing having an oil bath in the base, annular filter means supported within the casing with its periphery spaced from the casing to provide an air passage, means in the casing admitting air to said passage, and an annular bead in the casing projecting inward toward the filter periphery to cause a Venturi action and increase air velocity, said filter means having a plurality of openings therein adjacent the restricted area for discharge of excess oil in the filter whereby the Venturi action applies suction to withdraw the oil from the filter.

9. In an air cleaner, a casing having an oil bath in the base, means admitting air thereto, filtering material therein, means for supporting the filtering material including two spaced concavo-convex annular plates, the lower plate having a plurality of arcuate slots near its periphery, means secured to and extending between the two plate peripheries and spaced from the casing to provide an air passage, and an inwardly projecting bead in the casing adjacent the lower edge of the filter supporting means to cause a restriction to increase the air flow and cause a suction from the arcuate openings in the lower plate.

10. In an air cleaner, an annular receptacular element having an oil bath in the base and openings in the side walls, an annular filter element supported within the first named element with its outer periphery spaced from the outer wall of the receptacular element to provide an air inlet, and an inwardly projecting bead in the receptacular element to cause a restricted area to increase air velocity, the filter element including an annular lower plate adjacent the bead having therein a series of radial openings and a series of arcuate openings near the edge, the first named openings to allow the air and oil to pass upwardly into the filter and the second named openings to allow the excess oil to drain at the outer edge into the high velocity air stream.

11. In an air cleaner, an annular receptacular element, an annular filter element within the first named element, the inner portion of the filter element comprising a tubular member flared outwardly at the top, an inner tubular member on the receptacular element adapted for telescopic relation with the inner tube of the filter element and from which the filter element is supported within the receptacular element, a flanged edge on the filter element supported upon the outer wall of the receptacular element, and a cover supported on top of the filter element.

12. In an air cleaner, a receptacular body which constitutes a liquid reservoir, air inlet and outlet orifices in the body, a filter element to which liquid is supplied from the reservoir and from which air is conducted to the air outlet orifice disposed within the body, a passage through which air is conducted from the air inlet orifice into the filter element with a zone in it in which the pressure is materially lower than it is elsewhere in the passage, and an orifice which communicates directly with the filter element and the low pressure zone in the passage through which liquid may be drawn from the filter element into the low pressure zone.

13. In an air cleaner, a receptacular body which constitutes a liquid reservoir, air inlet and outlet orifices in the body, a filter element which is disposed within the body between the surface of the liquid and the air outlet orifice in the body with its side wall spaced from the side wall of the body so that it defines a passage constricted at one point to define a low pressure, high velocity zone through which air is conducted from the air inlet orifice in the body over the surface of the liquid in the reservoir into the filter element so that it carries liquid from the reservoir into the filter element, and an orifice which communicates directly with the filter element and the mentioned passage near the low pressure, high velocity zone and through which liquid may be drawn from the former into the latter.

14. In an air cleaner, a receptacular body which constitutes a liquid reservoir, air inlet and outlet orifices in the body, a filter element in which there are provided air inlet and outlet orifices disposed between the surface of the liquid and the air outlet orifice in the body with its air outlet orifice in communication with the air outlet orifice in the body, a passage constricted at one point to define a low pressure, high velocity zone through which air is conducted from the air inlet orifice in the body over the surface of the liquid in the reservoir into the air inlet orifice in the filter element so that it carries liquid from the reservoir into the filter element, and an isolated orifice in the filter element at a lower level than the inlet orifice in it which communicates directly with the low pressure, high velocity zone in the mentioned passage and through which liquid may gravitate and be drawn from the former into the latter.

15. In an air cleaner, an annular receptacular body which constitutes a liquid reservoir, air inlet and outlet orifices in the body, an annular filter element disposed between the inner and outer walls of the body and the air inlet and outlet orifices and spaced from the bottom of the body to define a passage which communicates with the air inlet orifice, an air outlet orifice in the filter element which communicates with the air outlet orifice in the body, an annular liquid discharge orifice in the bottom of the filter element near its outer edge, and an annular air inlet orifice in the bottom of the filter element between its inner edge and the liquid discharge orifice which communicates with the mentioned passage.

16. In an air cleaner, an annular receptacular body which constitutes a liquid reservoir, air inlet and outlet orifices in the body, an annular filter element with a concave lower wall to which liquid is supplied from the reservoir disposed between the inner and outer walls of the body and spaced from the latter and the bottom of the body to define a passage constricted at the lower outer edge of the filter element to define a high velocity, low pressure zone through which air may be conducted toward and over the surface of the liquid in the reservoir, an air outlet orifice in the filter element which communicates with the air outlet orifice in the body, a liquid discharge orifice in the filter element near its lower outer edge which communicates directly with the low pressure, high velocity zone so that liquid supplied to the filter element from the reservoir will gravitate and be drawn through it out of the filter element into the low pressure, high velocity zone, and an air inlet orifice which communicates with the mentioned passage in the bottom of the filter element between its inner edge and the liquid discharge orifice.

17. In an air cleaner, an annular receptacular body which constitutes a liquid reservoir, air inlet and outlet orifices in the body, an annular filter element disposed between the inner and outer walls of the body and the air inlet and outlet orifices and spaced from the bottom of the body to define a passage which communicates with the air inlet orifice, an air outlet orifice in the filter element which communicates with the air outlet orifice in the body, an annular air inlet orifice in the lower wall of the filter element, and circumferentially distributed slots in the lower wall of the filter element which extend from the air inlet orifice to points near its outer edge.

18. In an air cleaner, an annular receptacular body which constitutes a liquid reservoir, air inlet and outlet orifices in the body, an annular filter element disposed between the inner and outer walls of the body and the air inlet and outlet orifices and spaced from the bottom of the body to define a passage which communicates with the air inlet orifice, and an annular baffle which extends from the inner toward the outer wall of the body but terminates sufficiently short of the latter and above the surface of the liquid in the reservoir as to define with the surface of the liquid a pocket through which air passes before it enters the filter element from the air inlet orifice.

19. In an air cleaner, an annular receptacular body which constitutes a liquid reservoir, an annular filter element, with air inlet and outlet orifices in it, which is separable from the body and disposed between its inner and outer walls and rests on the upper end of the former and is spaced from the latter and the bottom of the body to define a passage through which air may travel toward the air inlet orifice in the filter element, a cover separable from the body and the filter element between which and the body the filter element is clamped, and an air discharge orifice for the air cleaner which communicates with the air outlet orifice in the filter element.

20. In an air cleaner, an annular receptacular body which constitutes a liquid reservoir, an annular filter element with air inlet and outlet orifices in it which is separable from the body and disposed between and rests on its inner and outer side walls with its outer side wall spaced from the outer side wall and the bottom of the body to define a passage through which air may travel toward the air inlet orifice in the filter element, an orifice in the outer side wall of the body through which air may be admitted into the passage between the filter element and the outer side wall of the body, a cover for the upper end of the filter element which is separable from the body and the filter element and between which and the body the filter element is clamped, and an air discharge orifice for the air cleaner which communicates with the air outlet orifice in the filter element.

21. In an air cleaner, a body which is partly filled with a liquid, air intake and discharge orifices in the body, a member with a generally cylindrical wall which is spaced radially from the side wall of the body and divides the interior of the body into a passage through which air is conducted from the air intake orifice downwardly toward the surface of the liquid and a passage through which air is conducted upwardly from the surface of the liquid toward the air discharge orifice, and filtering material within the last mentioned passage above the surface of the liquid, an orifice through which air enters the last mentioned passage, the specified member having in it above the surface of the liquid near the junction of the mentioned passages an opening through which liquid carried into the filtering material by the upwardly traveling current of air may be discharged into the downwardly traveling current of air.

22. In an air cleaner, a bowl-like member, a tube-like member which is secured in an orifice in the bottom of the bowl-like member and with it defines a liquid reservoir, an annular filter member with an air inlet orifice in its lower wall and an air outlet orifice in its upper wall disposed within the bowl-like member and spaced from its side wall and bottom to define a passage through which air may travel from the atmosphere to the air inlet orifice in the lower wall of the filter member, a cover into which the air outlet orifice in the upper wall of the filter member opens, an orifice in the cover, an air outlet fitting into which the orifice in the cover opens, a closure for the lower end of the tube-like member, and means for securing the outlet fitting and the closure over the orifice in the cover and the lower end of the tube-like member including a member which extends through the orifice in the cover and the tube-like member and is connected to the outlet fitting and the closure.

23. In an air cleaner, a bowl-like member, a tube-like member which is secured in an orifice in the bottom of the bowl-like member and with it defines a liquid reservoir, an annular filter member with an air inlet orifice in its lower wall and an air outlet orifice in its upper wall disposed within the bowl-like member and spaced from its side wall and bottom to define a passage through which air may travel from the atmosphere to the air inlet orifice in the lower wall of the filter member, a cover into which the air outlet orifice in the upper wall of the filter member opens, a tube-like member through which air is withdrawn from the air cleaner opening into it through the cover, means for preventing entrance of air into the air cleaner through the first specified tube-like member, and means for securing the cover in place including a member which extends into the tube-like member and is connected to the cover and the last specified means.

24. In an air cleaner, a bowl-like member, a tube-like member which is secured in an orifice in the bottom of the bowl-like member and with it defines a liquid reservoir, an annular filter member with an air inlet orifice in its lower wall and an air outlet orifice in its upper wall disposed within the bowl-like member and spaced from its side wall and bottom to define a passage through which air may travel from the atmosphere to the air inlet orifice in the lower wall of the filter member, a cover into which the air outlet orifice in the upper wall of the filter member opens, a tube-like member through which air is withdrawn from the air cleaner opening into it through the cover, means for preventing entrance of air into the air cleaner through the first specified tube-like member, and means for securing the cover in place including a member which extends into the first specified tube-like member and is connected to it and the cover.

HERBERT G. KAMRATH.